UNITED STATES PATENT OFFICE.

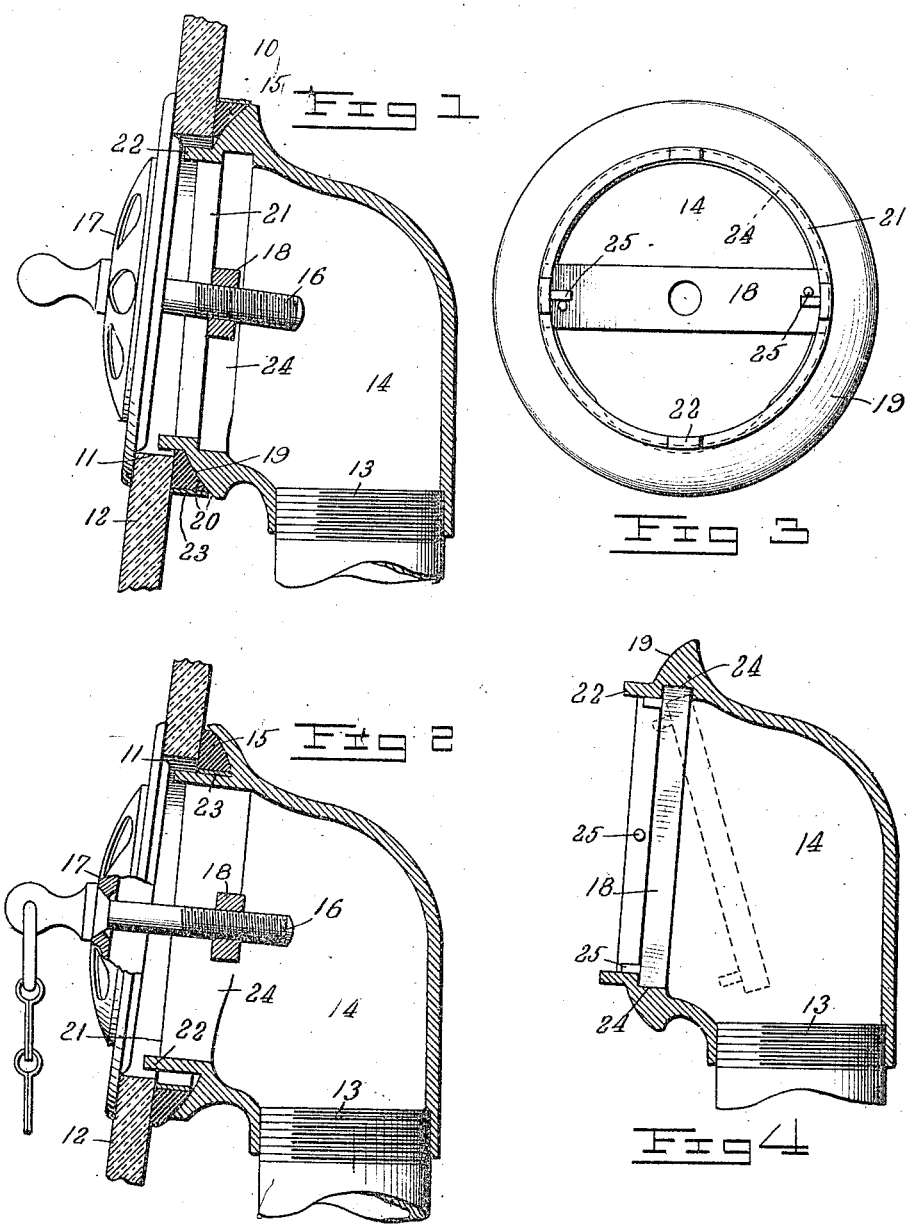

PHILIP MUELLER AND ANTON C. SCHUERMANN, OF DECATUR, ILLINOIS, ASSIGNORS TO H. MUELLER MFG. CO., OF DECATUR, ILLINOIS, A CORPORATION OF ILLINOIS.

COMBINED WASTE AND OVERFLOW.

1,059,748.  Specification of Letters Patent.  Patented Apr. 22, 1913.

Application filed August 11, 1910. Serial No. 576,767.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Combined Waste and Overflow, of which the following is a specification.

Our invention consists of a tub fitting, and is particularly designed for the attachment of drainage pipes to tubs. While directed especially to fittings for use in these situations, it will be evident upon an understanding of our invention that it may be used in connecting pipes to other receptacles than tubs and in other situations.

In making connection to tubs considerable difficulty is experienced on account of the inclination of the tub walls to the vertical. It is difficult to make a good tight joint from a vertical riser to the tube without the use of lead wiped joints. Vertically rising pipes nearly always present the neater appearance, and moreover if the lead pipe wiped joint may be omitted and connection made directly to the tub by attractive fittings, a neater job results.

The object of our invention is to produce such a joint of a drain pipe to a bath tub, which shall be suitable to tubs of different patterns the incline of the walls of which varies somewhat widely.

In the accomplishment of our invention we use a singe fitting and a washer to make this joint. Preferably the washer is a flexible washer. We form the engaging surfaces of the fitting and the washer spherically concave and convex to make a ball joint, whereby they may be positioned axially in different lines, and a tight joint may be made with the tub irrespective of the specific inclination of the walls of the tub.

The efficiency of this joint we improve by providing means for preventing substantial alteration of the diameter of the washer due to compression on the spherical engaging surface of the fitting. We also provide projections on one of the members to position the washer and to engage within an opening in the tub wall to position the connection accurately with respect to it.

In the accompanying drawings we have illustrated two specific embodiments of our invention.

Of the drawings—Figure 1 is a central section through one connection applied to a tub. Fig. 2 is a similar view of the other connection. Figs. 3 and 4 are respectively a front elevation and a vertical section of the form of elbow fitting illustrated in Fig. 1.

Referring first to Figs. 1, 10 is the tub, 11 is a drainage opening in the side wall 12 thereof, and 13 is the drainage pipe to be connected therewith. As shown this drainage pipe is substantially vertical, though it may be given any other suitable position. The elbow fitting 14 and the washer 15 are used to connect this pipe to the tub. The elbow is screw threaded to the end of the pipe, and the washer is clamped between the end of the fitting and the wall of the tub by a screw 16 passing through the strainer disk 17, across the opening, and engaging a cross bar 18 in the mouth of the elbow.

The elbow has a convex spherical end portion 19, and the washer a correspondingly spherically concave engaging surface 20 meeting this end surface of the elbow. By means of this provision the washer and the fitting may be adjusted axially with respect to each other so that their axes have different angular positions. The opposite surface is a plain surface adapted to engage the wall of the tub. The washer 15, as shown, has an internal diameter greater than the exterior diameter of the convex spherical end portion 19 at its inner edge, admitting of the eccentric movement of the washer over the convex end portion 19 to adjust the opposite sides thereof toward and from the wall 12 and insure the tight fitting of the elbow against the wall irrespective of the inclination of the elbow. By means of the ball and socket joint between the washer and the fitting, a washer may be positioned to make a tight joint with the wall of the tub irrespective of its inclination.

In order that the engaging surfaces of the washer and fitting may not project too far one beyond the other and make a rough looking joint or perhaps a leaky one, there is provided an annular projection 21 from the mouth of the fitting and within the spherical engaging portion 19. The washer being made of a certain internal diameter, it has only a certain limited movement with respect to the annular projection which it surrounds. Feet 22 projecting from the annular projection or rib 21 are adapted to enter the opening in a tub wall and accurately position the connection with respect to the same.

Embracing the washer is a metal band or ring 23, which prevents substantial alteration of the diameter of the washer when the same is under compression between the fitting and the tub. Without this the tendency of the washer to spread would be marked owing to the incline of the spherical engaging surface of the fitting. Any other suitable means may be used for this purpose, but we have found this means very efficient. These parts are clamped together and upon the wall of the tub by the screw 16 which engages the cross bar 18. This cross bar is preferably, as shown, removable, being held in place within the mouth of the elbow by means of a bayonet joint. Referring to Fig. 3 the nature of this connection of the parts to the fitting will be readily seen. An arc shaped way 24 is cut within the mouth of the fitting, almost entirely around it, being open only at the bottom or at the inner edge of the mouth of the elbow. By this means the bar may be inserted within the elbow as shown in Fig. 4 in dotted lines with one end free of the outer edge of the mouth of the elbow and the other end in the arc shaped way. Thereafter its inner end is pulled outward to the full line position shown in Fig. 4 until it seats in the opening in the way, whereupon it may be rotated to engage both ends in the way and to position it as shown in Fig. 3. It will be evident that when in this position gravity will hold both ends in engagement with the walls of the mouth so that slippage before the screw 16 is turned home and the connection is clamped in place will be prevented. In order, however, to more accurately position the cross bar and to prevent turning of the same during the turning of the screw should there be applied moment sufficient to turn it, stops 25 on the fitting and the cross bar respectively are provided. These stops engage each other when the screw is turned right-handedly and prevent movement of the cross bar which might prevent the screw being turned up as far as desired. When it is desired to clean a pipe which has become stopped up from any cause, the connection is loosened by removing the screw 16, and thereafter the cross bar is easily removed by reversing the operation by which it was put in place.

The embodiment of Fig. 2 differs from the embodiment of Fig. 1 simply in the fact that the spherical engaging surface of the fitting is made concave instead of convex and the engaging surface of the washer is made convex instead of concave. The metallic band for preventing alteration of the diameter of the washer is correspondingly placed inside the washer instead of outside, the compression tending to decrease the diameter of the washer instead of to increase it as was formerly the case. In this Fig. 2 the washer 15 is also shown to be of larger internal diameter than the external diameter of the flange 21 engaging through the washer. This enlargement of the washer 15 admits of its adjustment eccentrically over the concave face of the elbow whereby the washer automatically adjusts itself between the wall and the elbow, as in the preferred form, when the elbow is pressed against the wall irrespective of the inclination of the elbow.

Other embodiments of our invention will suggest themselves to those skilled in the art, and we therefore desire to cover in the annexed claims all embodiments of our invention which do not depart from its generic spirit.

What we claim is:

1. A combined waste and overflow connection for tubs comprising an elbow adapted at one end for attachment to a drainage pipe, the opposite end of said elbow having an annular convex face and an annular flange outstanding from the inner edge of the face for engagement in an opening in the wall of the tub, said convex face flaring outwardly and backwardly from the wall, a packing ring about the flange bearing against the convex face and having an inner diameter greater than the outer diameter of the flange whereby the packing ring is adapted for adjustment eccentric to the convex face, a disk strainer arranged over the opening at the opposite side of the tub wall and having a flange engaging said wall about the opening, means connecting the disk strainer to the elbow adapted to draw the same together against the sides of the wall, and a band encircling said packing ring adapted to prevent undue spreading of the same.

2. A combined waste and overflow connection for tubs comprising an elbow adapted for attachment at one end to a drainage pipe, the opposite end of said elbow having an annular enlarged portion and an annular flange extending outwardly from the inner edge thereof for engagement into an opening in the wall of the tub at one side thereof, a packing ring disposed about the flange and having an inner diameter greater than the exterior diameter of the flange whereby the packing ring is adapted for eccentric adjustment about the flange, said enlarged portion and said packing ring having complemental concave and convex engaging faces, a disk strainer closing the opening at the opposite side of the wall and having a flange engaging the wall about the opening, and means engaging the disk strainer and the elbow adapted to draw the same together and bind them against the opposite sides of the wall.

In testimony whereof we have hereunto set our hands in presence of two subscribing witnesses.

PHILIP MUELLER.
ANTON C. SCHUERMANN.

Witnesses:
  LEONARD F. MCKIBBEN,
  WILLIAM R. BIDDLE.